(12) United States Patent
Lo et al.

(10) Patent No.: US 10,810,401 B2
(45) Date of Patent: Oct. 20, 2020

(54) FINGERPRINT SENSING DEVICE AND FINGERPRINT SENSING METHOD

(71) Applicant: Gingy Technology Inc., Hsinchu (TW)

(72) Inventors: Yi-Chung Lo, Hsinchu (TW); Shih-Ju Ho, Hsinchu (TW); Chih-I Cheng, Hsinchu (TW)

(73) Assignee: Gingy Technology Inc., Hsinchu (TW)

(*) Notice: Subject to any disclaimer, the term of this patent is extended or adjusted under 35 U.S.C. 154(b) by 0 days.

(21) Appl. No.: 16/275,288

(22) Filed: Feb. 13, 2019

(65) Prior Publication Data

US 2020/0005018 A1 Jan. 2, 2020

Related U.S. Application Data

(60) Provisional application No. 62/691,631, filed on Jun. 29, 2018.

(30) Foreign Application Priority Data

Aug. 2, 2018 (TW) .............................. 107126927 A (51) Int. Cl.
*G06K 9/00* (2006.01)
(52) U.S. Cl.
CPC ....... *G06K 9/00067* (2013.01); *G06K 9/0004* (2013.01)
(58) Field of Classification Search
None
See application file for complete search history.

(56) References Cited

U.S. PATENT DOCUMENTS

| 6,330,345 | B1 * | 12/2001 | Russo .................. G06K 9/0002 |
| | | | 348/218.1 |
| 2016/0300094 | A1 * | 10/2016 | Lu ....................... G06K 9/00885 |
| 2017/0085813 | A1 * | 3/2017 | Reinhold ............. H04N 5/3532 |
| 2020/0021747 | A1 * | 1/2020 | Song ......................... G06T 7/60 |

FOREIGN PATENT DOCUMENTS

| CN | 102289313 | 10/2013 |
| TW | 201115480 | 5/2011 |
| TW | 201635195 | 10/2016 |
| TW | 201820104 | 6/2018 |

OTHER PUBLICATIONS

"Office Action of Taiwan Counterpart Application," dated Mar. 27, 2019, p. 1-p. 9.

* cited by examiner

*Primary Examiner* — Joseph R Haley
(74) *Attorney, Agent, or Firm* — JCIPRNET (57) ABSTRACT

A fingerprint sensing device includes a fingerprint sensor and a processor. The fingerprint sensor is configured to acquire a plurality of fingerprint reference frames. The processor is coupled to the fingerprint sensor. The processor is configured to superimpose the plurality of fingerprint reference frames. The processor analyzes the plurality of fingerprint reference frames to determine multiple first regions and multiple second regions of the plurality of fingerprint reference frames. The processor calculates multiple reference pixel values of the plurality of fingerprint reference frames according to multiple weight value functions to generate a superimposed fingerprint frame. The weight value functions corresponding to the first regions of the plurality of fingerprint reference frames are linearly changed.

18 Claims, 7 Drawing Sheets

FINGERPRINT SENSING DEVICE AND FINGERPRINT SENSING METHOD

CROSS-REFERENCE TO RELATED APPLICATION

This application claims the priority benefit of U.S. provisional application Ser. No. 62/691,631, filed on Jun. 29, 2018, and Taiwan application serial no. 107126927, field on Aug. 2, 2018. The entirety of the above-mentioned patent applications are hereby incorporated by reference herein and made a part of this specification.

FIELD OF INVENTION

The invention relates to a fingerprint sensing technology and particularly relates to a fingerprint sensing device and a fingerprint sensing method.

DESCRIPTION OF RELATED ART

With the progress of fingerprint sensing technology, fingerprint sensing devices are widely used in various electronic products. However, in the process of fingerprint sensing, a common fingerprint sensing device may acquire a fingerprint frame with much lower image dynamic range (DR) because of much higher brightness of background light, much lower brightness of background light or non-uniform brightness of background light, or because of a user's finger without being fully pressed on a fingerprint sensor. In other words, a common fingerprint sensing method may not be able to identify fingerprint details in fingerprint images in a high-brightness region of the fingerprint frame or in a low-brightness region of the fingerprint frame. Besides, even if an image optimization is performed in the common fingerprint sensing method for the high-brightness region and the low-brightness region of the fingerprint frame, the details in fingerprint images cannot be optimized. In view of the above, several solutions presented in embodiments will be described below.

SUMMARY OF THE INVENTION

The invention is directed to a fingerprint sensing device and a fingerprint sensing method, which is capable of generating a fingerprint frame with fingerprint images showing good fingerprint details for fingerprint identification.

In an embodiment of the invention, the fingerprint sensing device of the present invention includes a fingerprint sensor and a processor. The fingerprint sensor is configured to acquire a plurality of fingerprint reference frames. The processor is coupled to the fingerprint sensor. The processor is configured to superimpose the plurality of fingerprint reference frames. The processor analyzes the plurality of fingerprint reference frames to determine multiple first regions and multiple second regions of the plurality of fingerprint reference frames, and the processor calculates multiple reference pixel values of the plurality of fingerprint reference frames according to multiple weight value functions to generate a superimposed fingerprint frame. The weight value functions corresponding to the first regions of the plurality of fingerprint reference frames are linearly changed. One of the weight value functions corresponding to the second region of one of the fingerprint reference frames has a maximum value, and the other weight value functions corresponding to the second regions of the other fingerprint reference frames have minimum values.

In an embodiment of the invention, the fingerprint sensing method of the present invention is adapted to a fingerprint sensing device. The fingerprint sensing device includes a fingerprint sensor and a processor. The fingerprint sensing method comprises: acquiring a plurality of fingerprint reference frames by the fingerprint sensor; analyzing the plurality of fingerprint reference frames to determine multiple first regions and multiple second regions of the plurality of fingerprint reference frames by the processor; and calculating multiple reference pixel values of the plurality of fingerprint reference frames according to multiple weight value functions by the processor to generate a superimposed fingerprint frame. The weight value functions corresponding to the first regions of the plurality of fingerprint reference frames are linearly changed. One of the weight value functions corresponding to the second region of one of the fingerprint reference frames has a maximum value, and the other weight value functions corresponding to the second regions of the other fingerprint reference frames have minimum values.

Based on the above, the fingerprint sensing device and the fingerprint sensing method of the invention can acquire a plurality of fingerprint reference frames according to different exposure times. Besides, the fingerprint reference frames can be superimposed according to different weight value functions to generate a fingerprint frame with a fingerprint image showing precise and clear fingerprint details for fingerprint identification.

In order to make the above features and advantages of the invention more comprehensible, embodiments accompanied with drawings are described in detail below.

BRIEF DESCRIPTION OF THE DRAWINGS

The accompanying drawings are included to provide further understanding of the invention, and the drawings are incorporated in and constitute a part of this specification. The drawings illustrate exemplary embodiments and, together with the description, serve to explain the principles of the invention.

DETAILED DESCRIPTION OF DISCLOSED EMBODIMENTS

In order to make the content of the invention easier to understand, embodiments are described below as examples of how the invention can be implemented. Moreover, when applicable, devices/components/steps having the same reference numerals in figures and embodiments represent the same or similar parts.

Figure 1:
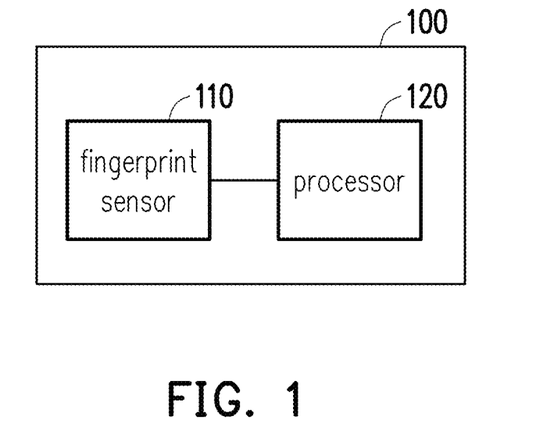
FIG. 1 is a block diagram of a fingerprint sensing device according to an embodiment of the invention.

FIG. 1 is a block diagram of a fingerprint sensing device according to an embodiment of the invention. Referring to FIG. 1, the fingerprint sensing device 100 includes a fingerprint sensor 110 and a processor 120. The fingerprint sensor 110 is coupled to the processor 120. In this embodiment, the fingerprint sensing device 100 can be a module, which can be integrated into an electronic device. The electronic device can be a mobile phone, a tablet, a notebook, a desktop, or various portable electronic devices such as electronic products that provide the function of fingerprint sensing. In this embodiment, when a user places his finger on the fingerprint sensing device 100 for fingerprint sensing, the fingerprint sensing device 100 can continuously acquire a plurality of fingerprint reference frames by the fingerprint sensor 110 to analyze and process the fingerprint reference frames, so that a fingerprint frame with good image quality can be acquired by superimposing the fingerprint reference frames, which is helpful for fingerprint identification. A fingerprint frame is considered to have a good image quality when a fingerprint image shows precise and clear fingerprint details.

In this embodiment, the fingerprint sensing device 100 can be an optical fingerprint sensing device, for example, a reflective fingerprint sensing device or a screen-type fingerprint sensing device. The invention is not limited to the above-mentioned fingerprint sensing device. In this embodiment, the fingerprint sensor 110 can be an image sensor, for example, a charge-coupled device (CCD) or a complementary metal-oxide semiconductor (CMOS). The invention is not limited to the above-mentioned image sensor. In this embodiment, the fingerprint sensor 110 can acquire a plurality of fingerprint reference frames according to different exposure times for outputting the fingerprint reference frames to the processor 120.

In this embodiment, the processor 120 can be a central processing unit (CPU), or other programmable microprocessor for general application or specific application, a digital signal processor (DSP), a programmable controller, an application specific integrated circuit (ASIC), programmable logic device (PLD), other similar processors, or a combination of the above processor circuits. The processor 120 can perform frame analyzing and processing on a plurality of fingerprint frames provided by the fingerprint sensor 110. In addition, the fingerprint sensing device 100 in this embodiment may further include a memory. The memory can be used for storing frames and images captured by the fingerprint sensor 110, and for storing related image processing programs or frame processing modules that can be used for implementing the fingerprint identification method according to various embodiments of the invention, so that the processor 120 can read and execute the programs or modules stored in the memory. In one embodiment, the memory may store, for example, a frame analyzing module, a frame superimposing module, and a frame optimization module. The memory of the invention is not limited to store the above-mentioned modules. The frame analyzing module, the frame superimposing module and the frame optimization module according to various embodiments of the invention may also be implemented by specific circuits along with software.

Figure 2:
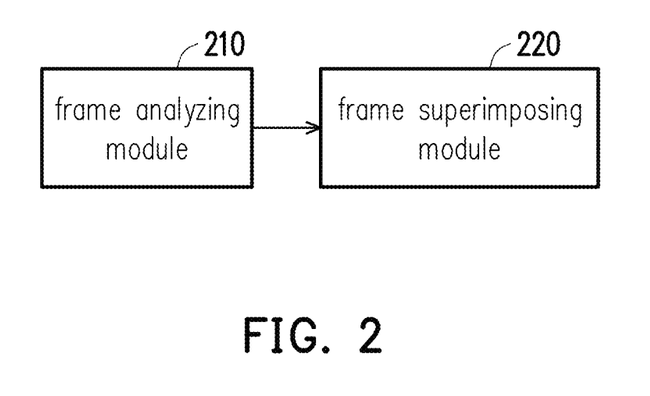
FIG. 2 is a block diagram of a plurality of modules according to an embodiment of the invention.

FIG. 2 is a block diagram of a plurality of modules according to an embodiment of the invention. Referring to FIG. 1 and FIG. 2, when the fingerprint sensor 110 acquires a plurality of fingerprint reference frames, the processor 120 can execute the frame analyzing module 210 and the frame superimposing module 220. For example, the frame analyzing module 210 and the frame superimposing module 220 can be pre-stored in the memory for being read and executed by the processor 120. The processor 120 may first analyze the fingerprint reference frames by executing the frame analyzing module 210 to determine multiple first regions and multiple second regions of the fingerprint reference frames. The frame analyzing module 210 provides analyzed fingerprint reference frames and related parameters set by the frame analyzing module 210 to the frame superimposing module 220. Then, the processor 120 can calculate multiple reference pixel values of the fingerprint reference frames according to multiple weight value functions by executing the frame superimposing module 220 to generate a superimposed fingerprint frame. The method to superimpose the plurality of fingerprint reference frames will be demonstrated in detail according to the embodiments of FIG. 3 to FIG. 5 below.

Figure 3:
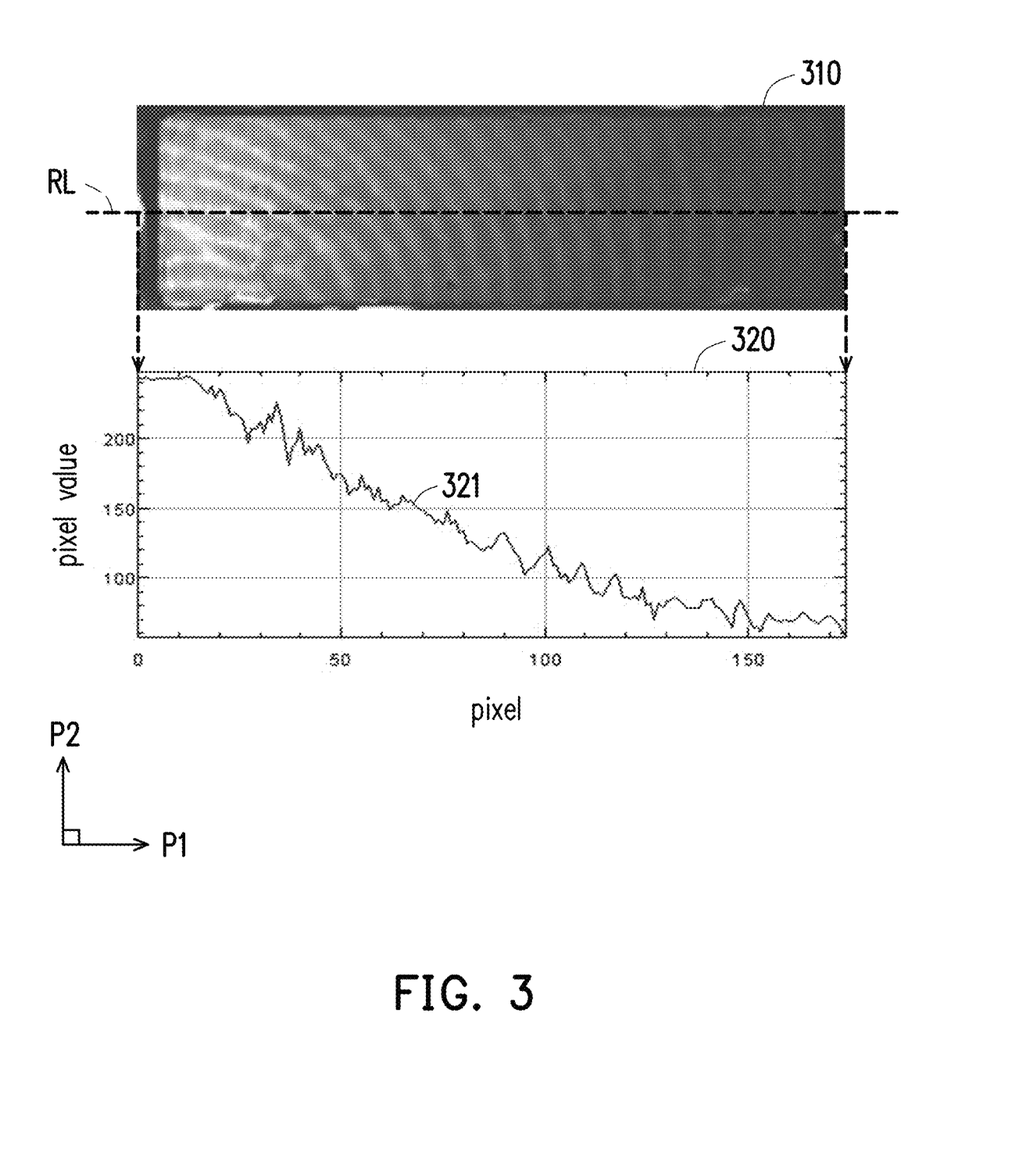
FIG. 3 is a schematic diagram of a first fingerprint reference frame according to an embodiment of the invention.
Figure 4:
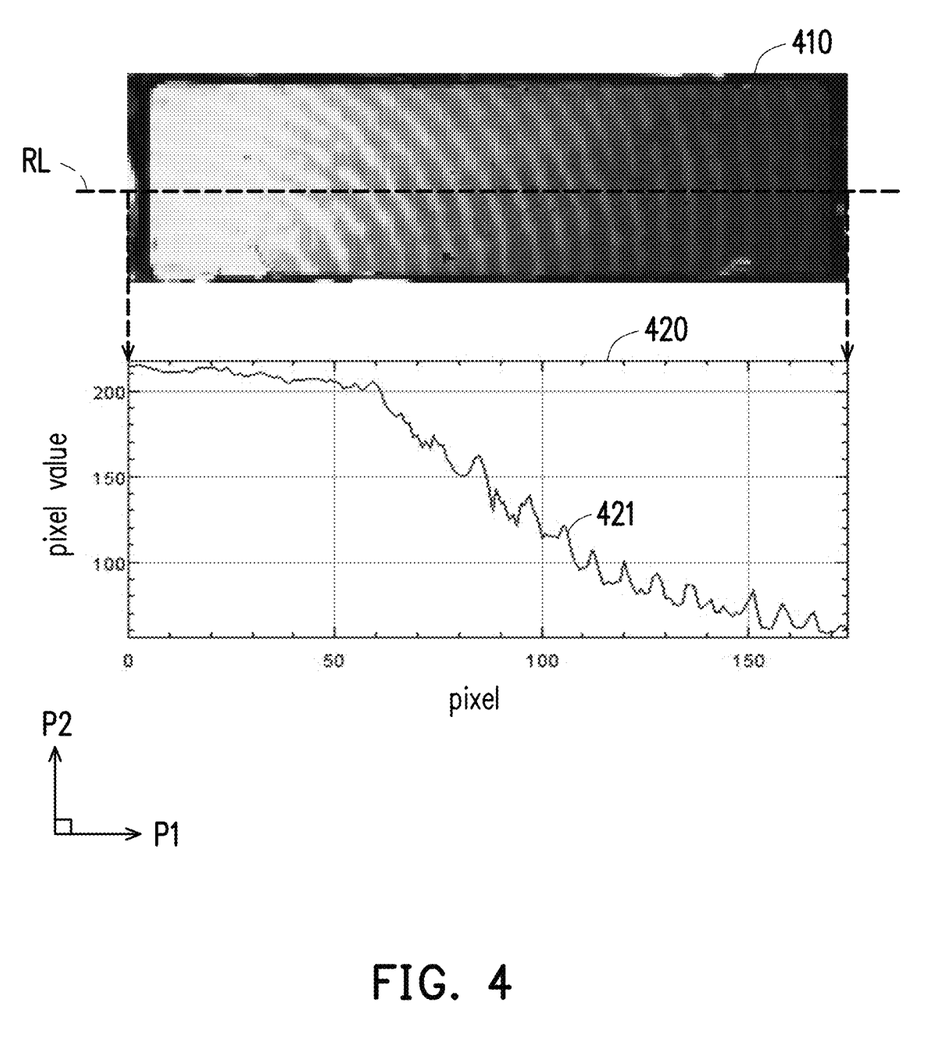
FIG. 4 is a schematic diagram of a second fingerprint reference frame according to an embodiment of the invention.

FIG. 3 is a schematic diagram of a first fingerprint reference frame according to an embodiment of the invention. FIG. 4 is a schematic diagram of a second fingerprint reference frame according to an embodiment of the invention. Referring to FIG. 1 to FIG. 4, when a user places his finger on the fingerprint sensing device 100 for fingerprint sensing, the fingerprint sensing device 100 can continuously acquire the first fingerprint reference frame 310 and the second fingerprint reference frame 410 by the fingerprint sensor 110 according to different exposure times, and the fingerprint sensing device 100 can execute the frame analyzing module 210 to analyze the first fingerprint reference frame 310 and the second fingerprint reference frame 410. Moreover, the fingerprint sensor 110 of the invention is not limited to acquire two fingerprint reference frames for superimposing frames. In one embodiment, the processor 120 can first acquire an original fingerprint frame based on a normal (or preset) exposure time, and then determine a quantity of the fingerprint reference frames acquired by the fingerprint sensor 110 according to a dynamic range (DR) of the original fingerprint frame. The dynamic range of the original fingerprint frame is inversely proportional to the quantity of the fingerprint reference frames acquired by the fingerprint sensor 110. In other words, if the original fingerprint frame has a lower dynamic range, the fingerprint sensor 110 needs to acquire more fingerprint reference frames for superimposing frames.

In this embodiment, the processor 120 can analyze the first fingerprint reference frame 310 along a reference line RL to acquire a corresponding pixel value distribution 320. According to the pixel value variation 321 shown in the pixel value distribution 320, the left portion of the first fingerprint reference frame 310 has a higher brightness, and the right portion of the first fingerprint reference frame 310 has a lower brightness, which may be ascribed to the non-uniform brightness of background light or may be ascribed to a finger without being fully attached to the fingerprint sensor 110. In addition, the right portion of the first fingerprint reference frame 310 demonstrates a fingerprint image with less clear (lower contrast) fingerprint details compared with the right portion of the second fingerprint reference frame 410 because the first fingerprint reference frame 310 is acquired by a shorter exposure time. In contrast, the left portion of the first fingerprint reference frame 310 demonstrates a fingerprint image with more clear fingerprint details compared with the left portion of the second fingerprint reference frame 410.

In this embodiment, the processor 120 can analyze the second fingerprint reference frame 410 along a reference line RL to acquire a corresponding pixel value distribution 420. It will be noted that the position of the reference line RL in the first fingerprint reference frame 310 is the same as the position of the reference line RL in the second fingerprint reference frame 410. According to the pixel value variation 421 shown in the pixel value distribution 420, the left portion of the second fingerprint reference frame 410 has a higher brightness, and the right portion of the second fingerprint reference frame 410 has a lower brightness, which may be ascribed to the non-uniform brightness of background light or may be ascribed to a finger without being fully attached to the fingerprint sensor 110. In addition, the left portion of the second fingerprint reference frame 410 demonstrates a fingerprint image with less clear (lower contrast) fingerprint details compared with the left portion of the first fingerprint reference frame 310 because the second fingerprint reference frame 410 is acquired by a longer exposure time. In contrast, the right portion of the second fingerprint reference frame 410 demonstrates a fingerprint image with more clear fingerprint details compared with the right portion of the first fingerprint reference frame 310.

Therefore, in this embodiment, the processor 120 can determine the first regions and the second regions respectively corresponding to the first fingerprint reference frame 310 and the second fingerprint reference frame 410 based on the brightness conditions of the first fingerprint reference frame 310 and the second fingerprint reference frame 410. To be more precise, the processor 120 may take a region of the first fingerprint reference frame 310 as a desired reserved region 311 while the region of the first fingerprint reference frame 310 has the highest contrast compared with a corresponding region of the second fingerprint reference frame 410. In addition, the processor 120 may take a region of the second fingerprint reference frame 410 as a desired reserved region 411 while the region of the second fingerprint reference frame 410 has the highest contrast compared with a corresponding region of the first fingerprint reference frame 310. In other words, the desired reserved region 311 of the first fingerprint reference frame 310 demonstrates more clear fingerprint details compared with the corresponding region of the second fingerprint reference frame 410, and the desired reserved region 411 of the second fingerprint reference frame 410 demonstrates more clear fingerprint details compared with the corresponding region of the first fingerprint reference frame 310. In this embodiment, the processor 120 can determine the size of the desired reserved regions 311 and 411 according to a contrast ratio or a gray scale value. It will be noted that the first region of the first fingerprint reference frame 310 and the first region of the second fingerprint reference frame 410 are located in an overlapped section between the desired reserved region 311 of the first fingerprint reference frame 310 and the desired reserved region 411 of the second fingerprint reference frame 410. Similarly, the second regions of the first fingerprint reference frame 310 and the second regions of the second fingerprint reference frame 410 are located in regions other than the overlapped section between the desired reserved region 311 of the first fingerprint reference frame 310 and the desired reserved region 411 of the second fingerprint reference frame 410. In other words, the first region of the first fingerprint reference frame 310 and the first region of the second fingerprint reference frame 410 are located between the second regions of the first fingerprint reference frame 310 and the second regions of the second fingerprint reference frame 410.

In this embodiment, the processor 120 may perform a weighted average calculation on multiple pixel values of multiple pixels in the overlapped section (first region) between the desired reserved region 311 of the first fingerprint reference frame 310 and the desired reserved region 411 of the second fingerprint reference frame 410 according to a plurality of specific weight values, in order to acquire a fingerprint frame with a relatively continuous and smooth fingerprint image by superimposing the first fingerprint reference frame 310 on the second fingerprint reference frame 410, to effectively acquire the superimposed fingerprint frame. In addition, the processor 120 may dynamically adjust the size and range of the overlapped section (the first region) between the desired reserved regions 311 and 411 according to the respective contrast or grayscale values of the first fingerprint reference frame 310 and the second fingerprint reference frame 410. In this embodiment, the processor 120 may calculate each of the reference pixel values of the fingerprint reference frames according to the corresponding multiple weight value functions to generate the superimposed fingerprint frame. The embodiments of FIG. 5 to FIG. 6A will be described below for further understanding.

Figure 5:
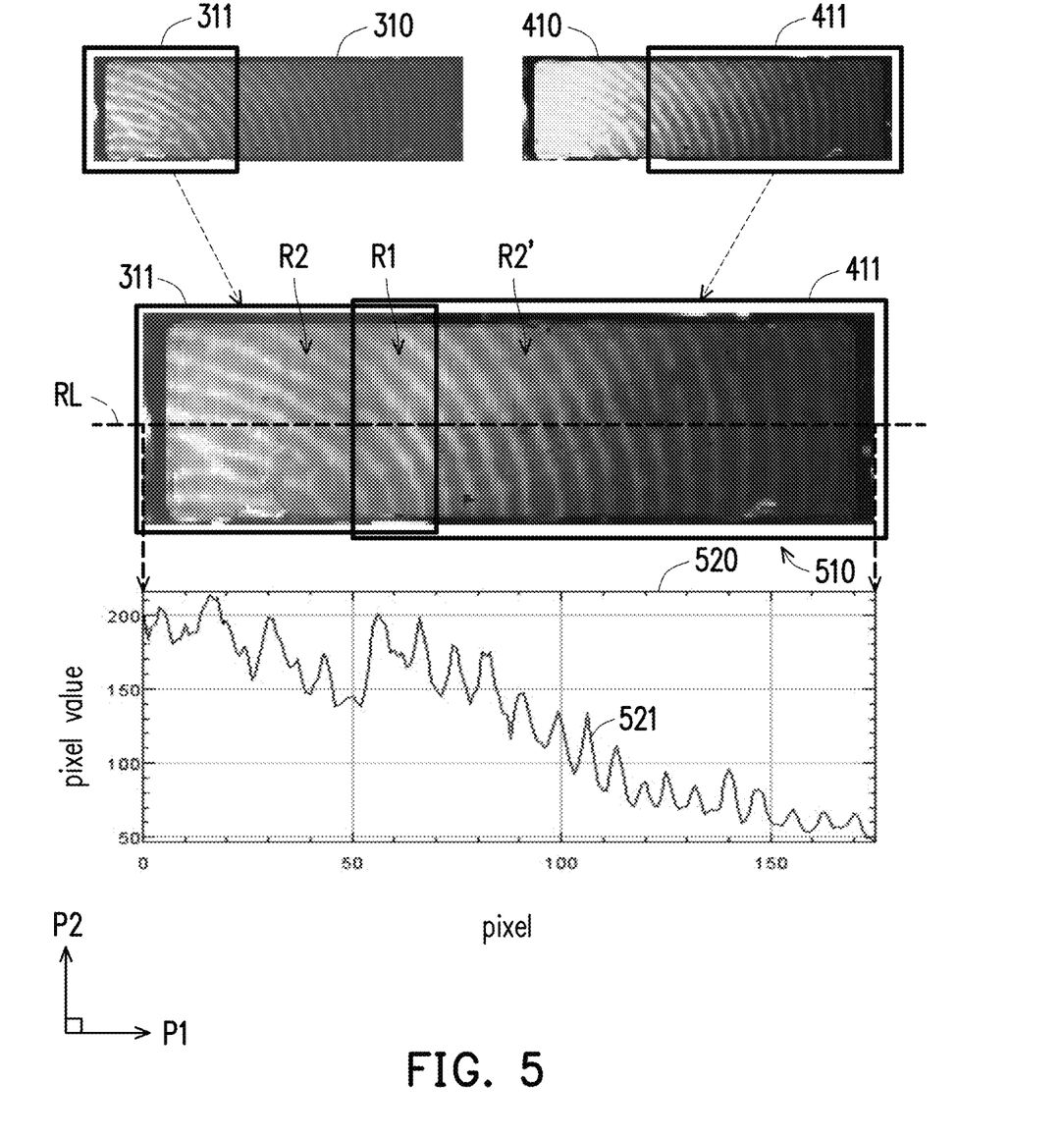
FIG. 5 is a superimposed diagram of a first fingerprint reference frame and a second fingerprint reference frame according to an embodiment of the invention.
Figure 6A:
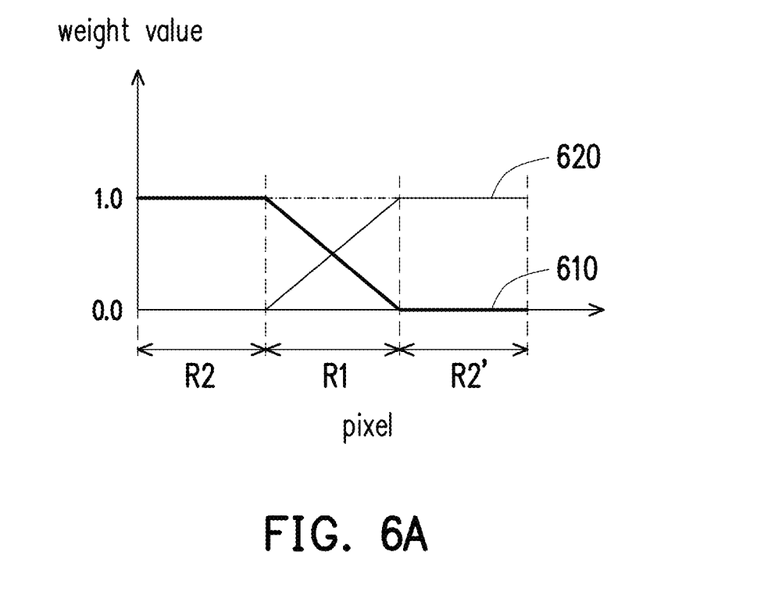
FIG. 6A is a schematic diagram illustrating weight value functions according to an embodiment of the invention.

FIG. 5 is a superimposed diagram of a first fingerprint reference frame and a second fingerprint reference frame according to an embodiment of the invention. FIG. 6A is a schematic diagram illustrating weight value functions according to an embodiment of the invention. Referring to FIG. 1 to FIG. 6A, the first fingerprint reference frame 310 and the second fingerprint reference frame 410 are superimposed with each other as a superimposed fingerprint frame 510. In this embodiment, the processor 120 can execute the frame superimposing module 220 to superimpose the first fingerprint reference frame 310 on the second fingerprint reference frame 410. To be more precise, the processor 120 may perform a weighted calculation on a plurality of pixels of the first fingerprint reference frame 310 according to the first weight value function 610 shown in FIG. 6A. The pixel values of the pixels of the first fingerprint reference frame 310 may be respectively multiplied by the same or different weight values in the first direction P1 according to the first weight value function 610, and the pixel values of the pixels of the first fingerprint reference frame 310 may be respectively multiplied by the same weight value in the second direction P2 according to the first weight value function 610. Similarly, the processor 120 may perform a weighed calculation on a plurality of pixels of the second fingerprint reference frame 410 according to the second weight value function 620 shown in FIG. 6A. The pixel values of the pixels of the second fingerprint reference frame 410 may be respectively multiplied by the same or different weight values in the first direction P1 according to the second weight value function 620, and the pixel values of the pixels of the second fingerprint reference frame 410 may be respectively multiplied by the same weight value in the second direction P2 according to the second weight value function 620. In this embodiment, the processor 120 can perform a weighted average calculation on the reference pixel values of the first fingerprint reference frame 310 and the second fingerprint reference frame 410 according to the first weight value function 610 and the second weight value function 620 to generate the superimposed fingerprint frame 510.

For example, the pixel value of each pixel in the desired reserved region 311 of the first fingerprint reference frame 310 corresponding to the second region R2 is assigned to a weight value of 1, and the pixel value of each pixel outside the desired reserved region 311 of the first fingerprint reference frame 310 corresponding to the second region R2' is assigned to a weight value of 0. Similarly, the pixel value of each pixel in the desired reserved region 411 of the second fingerprint reference frame 410 corresponding to the second region R2' is assigned to a weight value of 1, and the pixel value of each pixel outside the desired reserved region 411 of the second fingerprint reference frame 410 corresponding to the second region R2 is assigned to a weight value of 0. In addition, weight values assigned to the pixel values of the pixels in the desired reserved region 311 of the first fingerprint reference frame 310 corresponding to the first region R1 are linearly changed, and weight values assigned to the pixel values of the pixels in the desired reserved region 411 of the second fingerprint reference frame 410 corresponding to the first region R1 are linearly changed. The processor 120 can perform a weighted average calculation on the weighted pixel values corresponding to the pixels of the first fingerprint reference frame 310 and the pixels of the second fingerprint reference frame 410 to generate the superimposed fingerprint frame 510. As such, the superimposed fingerprint frame 510 keeps portions having more clear fingerprint details respectively shown in the first fingerprint reference frame 310 and in the second fingerprint reference frame 410.

Therefore, according to the pixel value variation 521 shown in the pixel value distribution 520, both the left portion and the right portion of the superimposed fingerprint frame 510 demonstrate more clear fingerprint details. The processor 120 can combine the pixel values of the pixels in the first region R1 (the overlapped section between the first fingerprint reference frame 310 and the second fingerprint reference frame 410) respectively corresponding to the first fingerprint reference frame 310 and the second fingerprint reference frame 410 according to a specific ratio (or a specific weight value variation), so that the superimposed fingerprint frame 510 demonstrates a fingerprint image showing precise and clear fingerprint details without showing discontinuous pixel values or discontinuous brightness variation. More importantly, the dynamic range of the superimposed fingerprint frame 510 will be higher than the dynamic range of the first fingerprint reference frame 310 and the dynamic range of the second fingerprint reference frame 410.

On the other hand, in this embodiment, weight values of the first weight value function 610 and the second weight value function 620 corresponding to the second region R2 and R2' are not limited to 0 or 1, and the weight values of the first weight value function 610 and the second weight value function 620 corresponding to the first region R1 are not limited to the linearly-changed weight values shown in FIG. 6A. Each of the weight values corresponding to the first weight value function 610 and the second weight value function 620 is within a range of 0 to 1. In one embodiment, the processor 120 can determine the weight values corresponding to the pixels in the second region R2 of the first fingerprint reference frame 310 as maximum values, and the processor 120 can determine the weight values corresponding to the pixels in the second region R2 of the second fingerprint reference frame 410 as minimum values. Similarly, the processor 120 can determine the weight values corresponding to the pixels in the second region R2' of the first fingerprint reference frame 310 as minimum values, and the processor 120 can determine the weight values corresponding to the pixels in the second region R2' of the second fingerprint reference frame 410 as maximum values. In addition, the weight values corresponding to the pixels in the first region R1 of the first fingerprint reference frame 310 and the weight values corresponding to the pixels in the first region R1 of the second fingerprint reference frame 410 have a lineally-changed relationship, and the lineally-changed relationship can be determined according to the fingerprint identification requirement, which is not limited to the embodiment of FIG. 6A.

In this embodiment, the processor 120 can execute, for example, the following equation (1) to superimpose the first fingerprint reference frame 310 on the second fingerprint reference frame 410 for generating the superimposed fingerprint frame 510. In the following equation (1), I refers to a superimposed fingerprint frame, a (i,j) refers to pixel values of the pixels in the first fingerprint reference frame 310, b (i,j) refers to pixel values of the pixels in the second fingerprint reference frame 410, w1(i) and w2(i) respectively refer to weight values corresponding to the weight value functions 610 and 620. The processor 120 can perform a weighted average calculation as in equation (1) to effectively superimpose the first fingerprint reference frame 310 on the second fingerprint reference frame 410.

$$I = \sum_{j=1}^{height} \sum_{i=1}^{width} [(a(i,j)*w1(i)) + b(i,j)*w2(i))/(w1(i)+w2(i))] \quad (1)$$

Figure 6B:
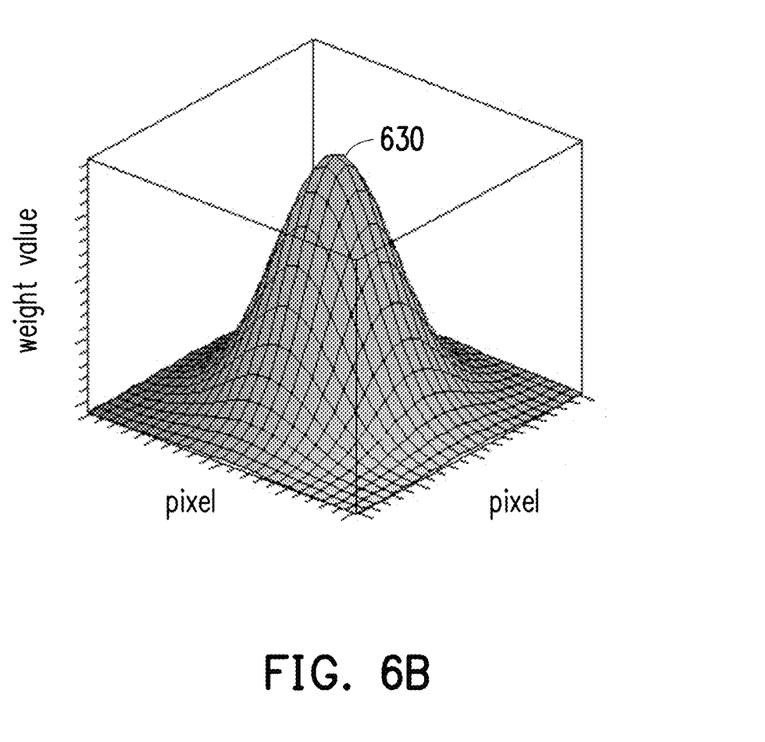
FIG. 6B is a schematic diagram illustrating a weight value function according to another embodiment of the invention.

However, the invention is not limited to the above equation (1), the processor 120 can also design a superimposing equation according to the image characteristics respectively corresponding to the first fingerprint reference frame 310 and the second fingerprint reference frame 410. In addition, the weight value functions of the invention are not limited to one-dimensional functions. In one embodiment, the weight value functions can also be two-dimensional functions. FIG. 6B is a schematic diagram illustrating a weight value function according to another embodiment of the invention. Referring to FIG. 1 to FIG. 5 and FIG. 6B, the weight value variations corresponding to the pixels in the first region R1 of the first fingerprint reference frame 310 and the weight value variations corresponding to the pixels in the first region R1 of the second fingerprint reference frame 410 can correspond to a two-dimensional function shown as the weight value function 630 in FIG. 6B. In other words, the processor 120 multiplies the pixel values corresponding to the pixels in the first region R1 of the first fingerprint reference frame 310 by the weight values corresponding to the weight value function 630 or multiplies the pixel values corresponding to the pixels in the first region R1 of the second fingerprint reference frame 410 by the weight values corresponding to the weight value function 630 to perform a finer frame superimposition.

Figure 7:
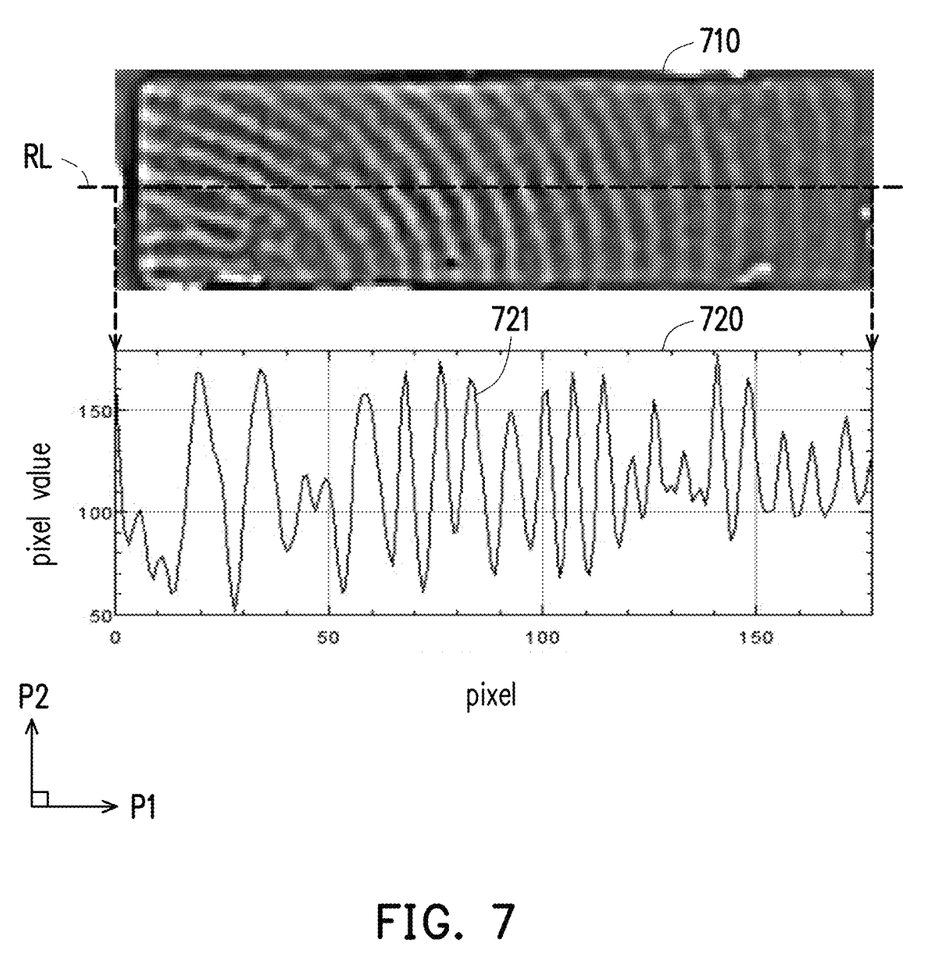
FIG. 7 is a schematic diagram of an optimized fingerprint reference frame according to an embodiment of the invention.

FIG. 7 is a schematic diagram of an optimized fingerprint reference frame according to an embodiment of the invention. Referring to FIG. 1 to FIG. 7, the processor 120 can also execute a frame optimization module to optimize the superimposed fingerprint frame 510, so that the optimized fingerprint frame 710 demonstrates more clear fingerprint details. The frame optimization module can be coupled to the frame superimposing module 220, and the processor 120 executes the frame optimization module after executing the frame superimposing module 220. In other words, the processor 120 can analyze the optimized fingerprint frame 710 along a reference line RL to acquire the corresponding pixel value distribution 720. According to the pixel value variation 721 shown in the pixel value distribution 720, the fingerprint details shown in the whole optimized fingerprint frame 710 demonstrate obvious pixel value variation. Thus, the processor 120 can analyze the optimized fingerprint frame 710 effectively to acquire the fingerprint feature information with higher accuracy. In this embodiment, the frame optimization module may perform, for example, gamma correction, histogram equalization, or sharpness adjustment on the superimposed fingerprint frame 510, which is not limited by the invention. On the other hand, in one embodiment, the frame optimization module can also be coupled to the frame analyzing module 210, and the processor 120 executes the frame optimization module before executing the frame analysis module 210. In other words, the processor 120 can first perform image optimization on the first fingerprint reference frame 310 and the second fingerprint reference frame 410, and then perform superimposing frames.

Figure 8:
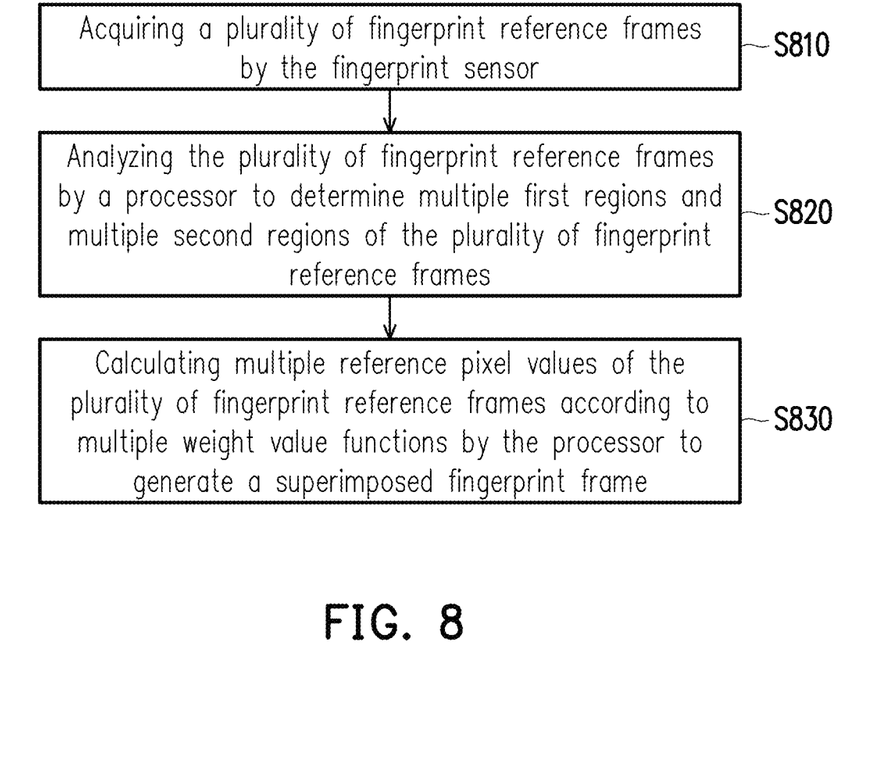
FIG. 8 is a flowchart of a fingerprint sensing method according to an embodiment of the invention.

FIG. 8 is a flowchart of a fingerprint sensing method according to an embodiment of the invention. Referring to FIG. 1 and FIG. 8, the fingerprint sensing method of FIG. 8 can be used at least for the fingerprint sensing device 100 of FIG. 1. When a user presses his finger on the fingerprint sensor 110 of the fingerprint sensing device 100 for fingerprint sensing, the fingerprint sensing device 100 can perform the following steps S810-S830. In the step S810, the fingerprint sensing device 100 acquires a plurality of fingerprint reference frames by the fingerprint sensor 110. In the step S820, the fingerprint sensing device 100 analyzes the plurality of fingerprint reference frames by the processor 120 to determine multiple first regions and multiple second regions of the plurality of fingerprint reference frames. In the step S830, the fingerprint sensing device 100 calculates multiple reference pixel values of the plurality of fingerprint reference frames according to multiple weight value functions by the processor 120 to generate a superimposed fingerprint frame. In this embodiment, the processor 120 can analyze the plurality of fingerprint reference frames to determine the weight value functions, or the weight value functions be preset by the processor 120 before performing the fingerprint sensing, which is not limited by the invention. In this embodiment, the weight value functions respectively corresponding to the first regions of the plurality of fingerprint reference frames are linearly changed. One of the weight value functions corresponding to the second region of one of the fingerprint reference frames has a maximum value, and the other weight value functions corresponding to the second regions of the other fingerprint reference frames have minimum values. Therefore, the fingerprint sensing method of the invention can generate a fingerprint frame with fingerprint images showing good fingerprint details for fingerprint identification.

In summary, the fingerprint sensing device and the fingerprint sensing method of the invention can acquire a plurality of fingerprint reference frames according to different exposure times, and can analyze the plurality of fingerprint reference frames automatically to correspondingly set multiple different weight value functions. The fingerprint reference frames can be superimposed with each other according to different weight value functions to generate a fingerprint frame with a fingerprint image showing precise and clear fingerprint details for fingerprint identification. In addition, the fingerprint sensing device and the fingerprint sensing method of the invention can effectively reduce discontinuous pixel values or discontinuous brightness variations of fingerprint detail images shown on the overlapped section of the fingerprint reference frames.

Although the invention has been provided with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A fingerprint sensing device, comprising:
 a fingerprint sensor, configured to acquire a plurality of fingerprint reference frames; and
 a processor, coupled to the fingerprint sensor, configured to superimpose the fingerprint reference frames,
 wherein the processor analyzes the fingerprint reference frames to determine a plurality of first regions and a plurality of second regions of the fingerprint reference frames, and the first regions of the fingerprint reference frames are located between the second regions of the fingerprint reference frames,
 wherein the processor calculates a plurality of reference pixel values of the fingerprint reference frames according to a plurality of weight value functions to generate a superimposed fingerprint frame,
 wherein the weight value functions corresponding to the first regions of the fingerprint reference frames are linearly changed,
 wherein one of the weight value functions corresponding to a second region of one of the fingerprint reference frames has a maximum value, and the other weight value functions corresponding to the second regions of the other fingerprint reference frames have minimum values.

2. The fingerprint sensing device according to claim 1, wherein the fingerprint sensor acquires the fingerprint reference frames according to different exposure times.

3. The fingerprint sensing device according to claim 1, wherein the processor determines a quantity of the fingerprint reference frames acquired by the fingerprint sensor according to a dynamic range of an original fingerprint frame, and the dynamic range of the original fingerprint frame is inversely proportional to the quantity of the fingerprint reference frames.

4. The fingerprint sensing device according to claim 1, wherein a dynamic range of the superimposed fingerprint frame is higher than a dynamic range of each of the fingerprint reference frames.

5. The fingerprint sensing device according to claim 1, wherein the processor performs a weighted average calculation on each of the reference pixel values of the fingerprint reference frames according to the weight value functions to generate the superimposed fingerprint frame.

6. The fingerprint sensing device according to claim 1, wherein the weight value functions are one-dimensional functions.

7. The fingerprint sensing device according to claim 1, wherein the weight value functions are two-dimensional functions.

8. The fingerprint sensing device according to claim 1, wherein the second region of the one of the fingerprint reference frames has a highest contrast compared with the second regions corresponding to the other fingerprint reference frames.

9. The fingerprint sensing device according to claim 1, wherein each of the weight values corresponding to the weight value functions is within a range of 0 to 1.

10. A fingerprint sensing method, adapted to a fingerprint sensing device, wherein the fingerprint sensing device comprises a fingerprint sensor and a processor, the fingerprint sensing method comprising:

acquiring a plurality of fingerprint reference frames by the fingerprint sensor;

analyzing the fingerprint reference frames to determine a plurality of first regions and a plurality of second regions of the fingerprint reference frames by the processor, wherein the first regions of the fingerprint reference frames are located between the second regions of the fingerprint reference frames; and     calculating a plurality of reference pixel values of the fingerprint reference frames according to a plurality of weight value functions by the processor to generate a superimposed fingerprint frame,     wherein the weight value functions corresponding to the first regions of the fingerprint reference frames are linearly changed,     wherein one of the weight value functions corresponding to a second region of one of the fingerprint reference frames has a maximum value, and the other weight value functions corresponding to the second regions of the other fingerprint reference frames have minimum values.

11. The fingerprint sensing method according to claim 10, wherein a step of acquiring the fingerprint reference frames by the fingerprint sensor comprises:

acquiring the fingerprint reference frames based on different exposure times by the fingerprint sensor.

12. The fingerprint sensing method according to claim 10, wherein the step of acquiring the fingerprint reference frames by the fingerprint sensor comprises:

determining a quantity of the fingerprint reference frames acquired by the fingerprint sensor according to a dynamic range of an original fingerprint frame by the processor,     wherein the dynamic range of the original fingerprint frame is inversely proportional to the quantity of the fingerprint reference frames.

13. The fingerprint sensing method according to claim 10, wherein a dynamic range of the superimposed fingerprint frame is higher than a dynamic range of each of the fingerprint reference frames.

14. The fingerprint sensing method according to claim 10, wherein a step of calculating the reference pixel values of the fingerprint reference frames according to the weight value functions by the processor to generate the superimposed fingerprint frame comprises:

performing a weighted average calculation on each of the reference pixel values of the fingerprint reference frames according to the weight value functions to generate the superimposed fingerprint frame.

15. The fingerprint sensing method according to claim 10, wherein the weight value functions are one-dimensional functions.

16. The fingerprint sensing method according to claim 10, wherein the weight value functions are two-dimensional functions.

17. The fingerprint sensing method according to claim 10, wherein the second region of the one of the fingerprint reference frames has a highest contrast compared with the second regions corresponding to the other fingerprint reference frames.

18. The fingerprint sensing method according to claim 10, wherein each of the weight values corresponding to the weight value functions is within a range of 0 to 1.

* * * * *